March 1, 1966 W. H. DECKER 3,237,262
FABRIC-FACED BELT-BUCKLE
Filed May 22, 1963 3 Sheets-Sheet 1
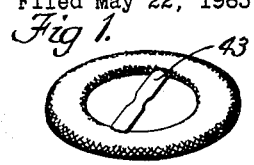
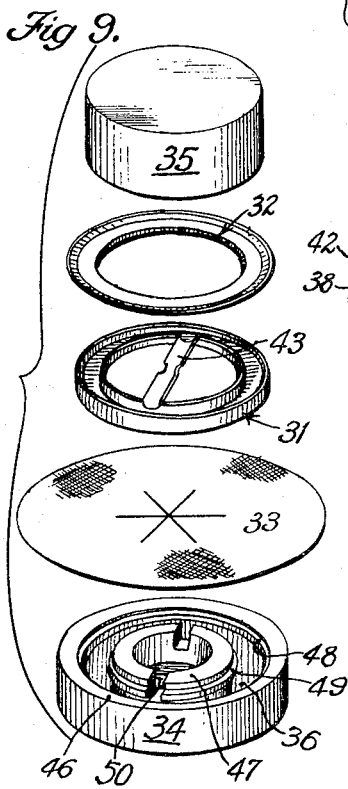
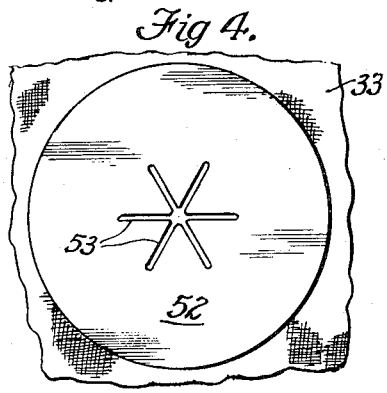
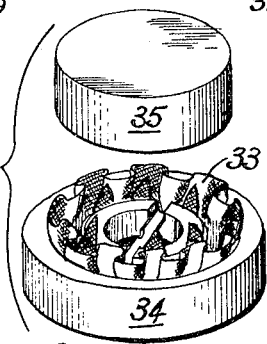
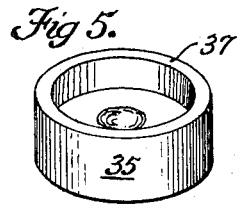
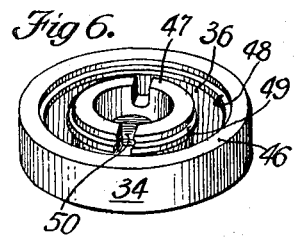
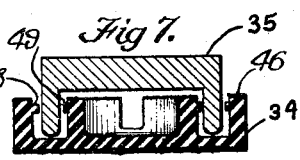
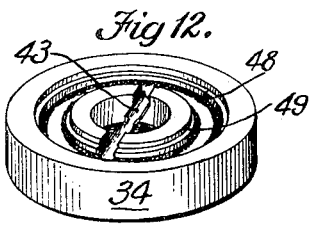
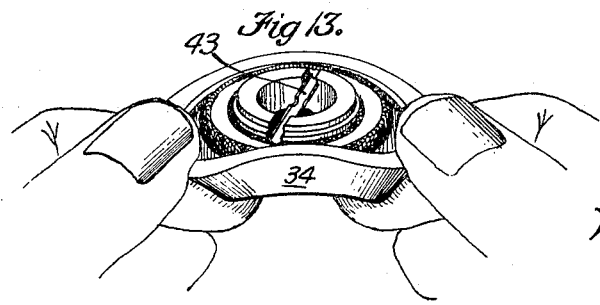
INVENTOR.
William H. Decker
BY Edwin Phelps
Attorney March 1, 1966  W. H. DECKER  3,237,262
FABRIC-FACED BELT-BUCKLE
Filed May 22, 1963  3 Sheets-Sheet 2
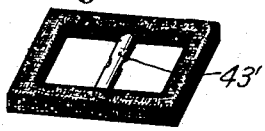
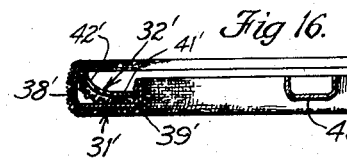
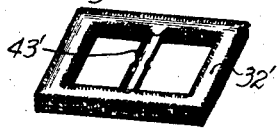
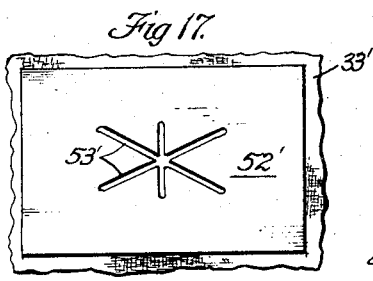
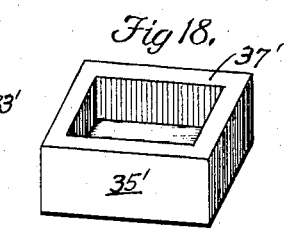
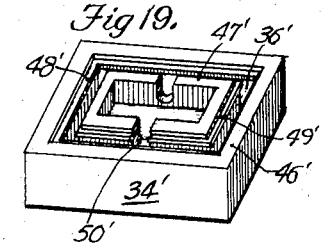
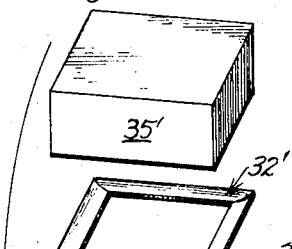
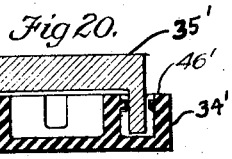
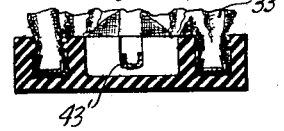
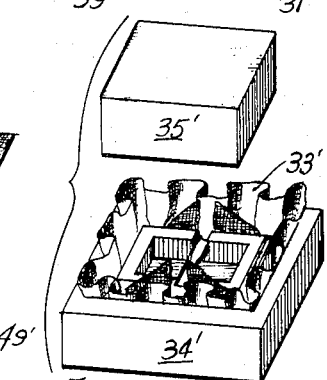
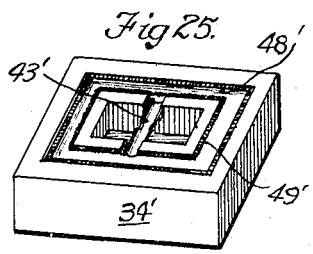
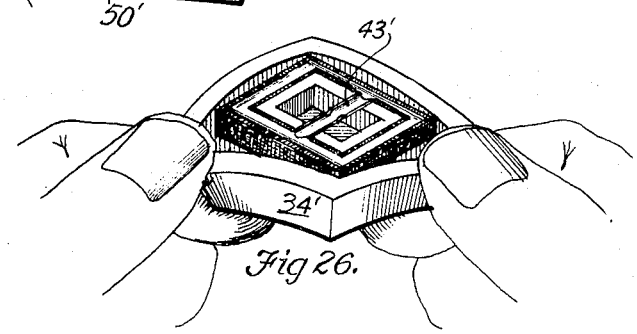
INVENTOR.
William H. Decker
BY Edwin Phelps
Attorney March 1, 1966 W. H. DECKER 3,237,262
FABRIC-FACED BELT-BUCKLE
Filed May 22, 1963 3 Sheets-Sheet 3

INVENTOR.
William H Decker
BY
Edwin Phelps
Attorney

United States Patent Office 3,237,262
Patented Mar. 1, 1966

1

3,237,262
FABRIC-FACED BELT-BUCKLE
William H. Decker, Chicago, Ill., assignor to Maxant Button & Supply Company, a corporation of Illinois
Filed May 22, 1963, Ser. No. 292,809
3 Claims. (Cl. 24—163)

This invention relates to a device for forming fabric-faced buckles for a variety of uses such as garments, hats, shoes, and upholstering, especially by the individual professional or do-it-yourself workman as set forth in co-pending application Ser. No. 848,579, filed October 26, 1959, now Patent No. 3,091,141.

For individually tailored garments, having belts, it is frequently desired to have the metal base for such buckles faced with the same fabric as, or contrasting with, that from which the garment is fashioned. Similarly, hats and other items may also be trimmed with fabric-covered buckles. This is done generally where only one such buckle is required.

For years buckle bases of nearly every imaginable contour and size have been available in stores supplied by the manufacturers of dressmaking accessories. These variously-shaped buckle bases generally comprise two metal stampings with flanged perimeters so dimensioned that one part nests within the other part. More often than not, these base parts will have cross bars whereon to hinge a prong.

Heretofore, the only known means and method by which the desired fabric-faced buckles could be made by hand was first by adhering a piece of fabric over the outer face of the larger of the buckle base parts, with the fabric perimeter overlying the inner face of base part, and subsequently superimposing the other base part on and pressing it down into the overlaid fabric and, with a suitable tool such as a pair of pliers, turning in the perimeter of the fabric-covered flange of the one base part to secure the other base part in nested relationship.

The foregoing procedure is awkward and slow to handle and, until one becomes experienced, the finished buckle is not always of acceptable appearance. A main objection to such buckles is that the adhesive is likely to stain the cloth in washing or cleaning.

The main objects of this invention are to provide an improved buckle-assembling device for effecting the interlocked nested positioning of two buckle base parts with fabric tautened over the face of one base part and the perimetrical portion of the fabric interposed between the two base parts; to provide a two-element assembling device of this kind in one of which elements the fabric and the buckle base parts are successively depressed by the other element to effect the final interlocking nested positioning of the two base parts solely by the fabric tautened over the one base part and interposed and tucked in between the two base parts; to provide an improved two-element assembling device of this kind adapted to be contoured to accommodate buckle base parts of practically any size and shape; and to provide an improved fabric-faced buckle-assembling device of this kind of such simple structure as to make its manufacture very economical and its use extremely facile by even the most inexperienced persons.

The drawings illustrate the form and function of two adaptations of fabric-faced buckle-assembling devices constructed in accordance with this invention, wherein FIGS. 1 and 2 are perspective views of the front and back respectively, of a fabric-faced circular buckle formed with an appropriate adaptation of this assembling device;

FIG. 3 is an enlarged cross-section of the finished buckle as shown in FIGS. 1 and 2;

FIG. 4 shows a preformed template laid on a piece of fabric for contouring the fabric and marking for slitting the center portion to insure fitting about the buckle base parts;

FIGS. 5 and 6 are perspective views of the two elements which constitute this improved assembling device for buckles of the style shown in FIGS. 1 and 2;

FIG. 7 is a cross-sectional view of these two elements as they are telescoped in the successive steps of forming a fabric-faced buckle of the style shown in FIGS. 1 and 2;

FIG. 8 is an enlarged, cross-sectional view of the two buckle base parts for use with which this particular adaptation of assembling device has been designed;

FIG. 9 is an exploded, perspective of the two elements between which are successively positioned the piece of fabric and the two base parts, in the axial sequence in which they are used to form the finished buckle;

FIG. 10 is an exploded, perspective of the two elements separated immediately after being used to depress the larger base part into the holding element, laid on a piece of fabric;

FIG. 11 is a cross-sectional view of the holding element as shown in FIG. 10;

FIG. 12 is a perspective view of the finished buckle in the holding element of the assembling device;

FIG. 13 is a perspective view of the finished buckle being removed from the holding element;

FIGS. 14 and 15 are perspective views of the front and back, respectively, of a fabric-faced, rectangular-shaped buckle formed with another adaptation of this assembling device;

FIG. 16 is an enlarged, cross-section of the finished buckle shown in FIGS. 14 and 15;

FIG. 17 shows a preformed template laid on a piece of fabric for contouring the fabric and marking for slitting the central portions to insure fitting around the buckle base parts;

FIGS. 18 and 19 are perspective views of the two elements which constitute this improved assembling device for buckles of the style shown in FIGS. 14 and 15;

FIG. 20 is a cross-sectional view of these two elements as they are telescoped in the successive steps for forming a fabric-faced buckle of the style shown in FIGS. 14 and 15;

FIG. 21 is an exploded, cross-sectional view of the two buckle base parts for a rectangular-shaped buckle;

FIG. 22 is an exploded, perspective of the two elements between which are successively positioned the piece of fabric and the buckle base parts, in the axial sequence in which they are used to form the finished buckle;

FIG. 23 is an exploded perspective of the two elements separated immediately after being used to depress the larger base part into the holding element, laid on a piece of fabric;

FIG. 24 is a cross-sectional view of the holding element as shown in FIG. 23;

Figure 27:
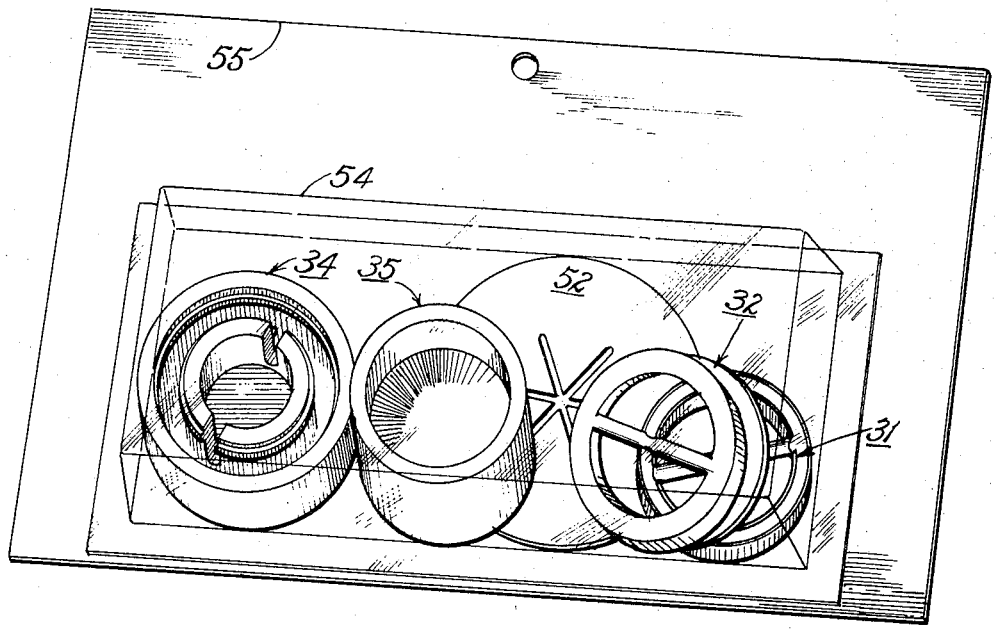

FIG. 25 is a perspective view of the finished buckle in the holding element of the assembling device; and FIG. 26 is a perspective view of the finished buckle being removed from the holding element; and FIG. 27 is a perspective view of one type of kit in which a number of base parts 31 and 32, a pair of assembling elements 34 and 35, a template 52 for that particular style of base parts, and sheet of instructions are marketed to be available for the individual professional or do-it-yourself workman to quickly and easily provide him with one or more buckles faced with fabric of his own choosing.

The essential concept of this invention involves a pair of elements each recessed inwardly from one face to form a cavity in one element and a telescoping rim on the other element approximately of the contours, respectively, of a pair of centrally open nestable buckle base parts whereby the elements may be repeatedly telescoped first, to depress into the one element one base part overlaid on a piece of fabric and, subsequently, to depress into the one element the other base part to effect its nested positioning of the base parts with the fabric tautened over the face of the one base part and the fabric perimeter interposed between the base parts to secure them in their interlocked relationship.

Two adaptations of this fabric-faced buckle-assembling device are shown, one for assembling circular style buckles and the other for assembling non-circular style buckles. The same reference numerals are used in describing the two adaptations except that primes supplement the numerals for FIGS. 14 to 26. Moreover, it will be understood that the following description of the structure and the use of the adaptation shown in FIGS. 1–13 applies equally to the adaptation shown in FIGS. 14–26, by merely reading the numerals with primes, which referring to the latter figures.

A fabric-faced buckle-assembling device designed for use with specially-formed buckle base parts 31 and 32, embodying the foregoing concept comprises a pair of elements 34 and 35 respectively recessed to form a cavity 36 and a stem 37 respectively conforming to the general contour of the buckle base parts 31 and 32 and adapted for repeated telescopic positioning to successively depress the base parts 31 and 32 into the element 34 on an overlaid piece of fabric 33 so as to tauten the fabric over the face of the base part 31 and interpose the fabric perimeter between the base parts 31 and 32 to secure them in interlocked relationship.

The buckle base parts 31 and 32 as herein shown, for use with which the elements 34 and 35 were specially designed, except for the relative shapes and dimensions, generally simulate buckle base parts that have long been available for the making of fabric-faced buckles, of either use circular or the non-circular styles. Heretofore, however, when made by hand the fabric has had to be adhered to the one base part, similar to the hereinshown part 31, and the two base parts have been nested with their concave faces opposed and secured in such nested relationship by manual bending over onto the inner base part the perimetrical edges of the outer or larger base part.

As is most apparent from FIG. 8 (and FIG. 21) the outer or larger base part 31 is of C-shaped cross-section with the outer flange 38 curved inwardly toward the practically straight opposite flange 39. As these figures further show, the flange 38 is much higher than the flange 39. The inner or smaller base part 32 is of slight arcuate cross-section with an inner flat portion 41 and an outer curved portion 42. The distance between the perimeters of the inner arcuate base part 32 is approximately the same as the distance between the opposed inner perimeters of the flanges 38 and 39 of the outer larger base part 31. So nearly are the aforesaid dimensions the same that the inner base part 31 generally and easily drops into nested position with the outer base part 32, with no fabric intervening. However, when they become so nested the parts 31 and 32 will not separate by merely turning them upside down and shaking them. In fact a very fine pointed instrument, such as a pin, will have to be inserted between the nested parts and the inner part 32 angled to the outer part 31 in order to effect a separation of the parts.

Being so formed the base parts 31 and 32 are adapted for assembly by depressing and snapping the part 32 into the part 31, with its convex face opposed to the concave face of the part 31, and with the perimetrical portion of the piece of fabric 33 interposed between the parts 31 and 32. Thereupon these two parts are locked in such nested relationship by the interposed fabric being drawn over the edges of the flanges 38 and 39 of the part 31 by the outer and inner perimeters of the inner part 32. (FIGS. 3 and 16).

The two buckle forms herein shown, are intended to be representative of the two primary styles of buckle in which belt buckles have long been made. One style is circular; the other style is non-circular. Obviously, the circular style can be of almost any desired diameter. The non-circular style, in addition to being of varying dimensions may be practically of any contour. One or both of the base parts 31 and 32 may have cross bars 43 for hinging the usual belt prong (not shown).

The fabric 33, used for facing a pair of base parts 31 and 32, may be of almost any character and practically any thickness. The thicker the fabric the more secure will be the locking of the parts in nested relationship. However, in the use of very sheer fabric it may be necessary to use multiple layers of the fabric or an inner layer of other material.

The element 34, herein referred to as the cup or holding element, is made of an elastic substance so that it may be distorted to permit the insertion of the base part 31 laid on fabric 33 of varying thicknesses, and to permit the separation of the finished buckle, as will be explained presently. The element 35, herein referred to as the pusher element, is made of wood, metal, or possibly plastic.

The cup element 34 is recessed inwardly from one face to from the cavity 36 between a perimetrical rim section 46 and an opposed central section 47. The shape and contour of the cavity 36 conform substantially to the shape and contour of the base part 31. In depth, the cavity 36 is about twice the axial thickness of the base part 31. Oppositely extending ribs 48 and 49 are formed on the opposed walls of the rim section 46 and the central section 47. These ribs are spaced above the bottom of the cavity 36 a distance just enough more than the axial thickness of the outer base part 31 to permit the latter to be depressed into the cavity with the upper edge of the flange 38 seated under the rib 48 with the fabric 33 interposed. When this assembly device is used with base parts 31 and 32 one of which has a cross bar 43, the central section 47 of the cup element 34 has a slot 50 crosswise of the section 47 to a depth practically that of the cavity 36.

The pusher element 35 is recessed inwardly from one face to form the rim 37, with a rounded edge, dimensioned and contoured substantially the same as the base part 32, hence readily insertable into the cup cavity 36 between the ribs 48 and 49.

To facilitate the forming of a piece of fabric 33 for proper tautening around the face of the base part 31 and interposing between the base parts 31 and 32, a template 52 is provided. This is of the shape and size to indicate the approximaate size and contour of the piece of fabric 33 most suitable for use with a particular pair of base parts 31 and 32. Such a template 52 is formed with a series of radiating slots 53 whereby the fabric may be marked for internal slitting to insure the best fitting around and between the base parts 31 and 32.

The hereinshown and described base parts 31 and 32 and the assembling elements 34 and 35 were conceived and constructed to make exceptionally facile fabric-facing of belt buckles by individual professional or do-it-yourself workmen. To that end one or more of pairs of interfitting base parts 31 and 32 of a particular style, a pair of assembling elements 34 and 35 and a template 52 are marketed in a kit in the form of a small, transparent container 54. One such a container is referred to in the trade as a "plastic blister." It is secured to a display card 55 for purchase, in stores at notion counters, by mail, by the individuals who desire to make their own fabric-faced buckles.

Upon obtaining such a kit the individual effects the fabric-facing of a buckle in the following manner:

(1) The template 52 is laid on the reverse side of the fabric to be used. With a suitable pencil the contour of the template 52 and the positions of the slots 53 are marked on the fabric. Thereupon the fabric is cut out on the contour line and slitted along the radial lines, ready for use.

(2) The piece of fabric 33 is placed on the cup element 34, as nearly centrally as possible, and the base part 31 positioned centrally on the fabric, with the concave side up.

(3) The pusher element 35 is then positioned with the rim 37 seated on the base part 31 between the flanges 38 and 39. Pressure is applied sufficient to force the base part 31 and fabric 33 down into the cavity 36 of the cup element 34 below the ribs 48 and 49. As is most evident from FIG. 11 (FIG. 24) the pressing of the fabric-covered base part 31 below the ribs 48 and 49, because of the friction material of the element 34, tends to tauten the fabric 33 smoothly over the face of the base part 31 and urge the fabric over the flanges 38 and 39 inwardly so as to facilitate the next step.

(4) The pusher element 35 is then removed and the perimetrical portion of the fabric is pressed down into the cavity 36 and onto the base part 31.

(5) The base part 32 is then placed on the cup element 34 over the cavity 36 with the concave side up. The pusher element 35 then is positioned with the rim 37 on the base part 32. Pressure is applied to force the base part 32 down into the cavity, against the fabric over the base part 31 until the base part 32 snaps in between and below the flanges 38 and 39 on the base part 31.

(6) After removing the pusher element 35, the cup element 34 is grasped, somewhat as shown in FIG. 13 (or FIG. 26), and twisted to permit a finger or thumb to be inserted under the finished buckle and remove it from the cup element.

As so clearly shown in FIGS. 1, 2, 12, and 13 (FIGS. 14, 15, 25, and 26) the fabric 33 is tautened over the face of the outer base part 31 and the perimetrical portion of the fabric is drawn firmly over the edges of the flanges 48 and 49. Thereupon the base parts 31 and 32 are locked in their nested relationship by the fabric 33 ready to have a belt prong (not shown) fastened to the cross bar 43 or 43'. Only by mutilating the finished buckle could the base parts 31 and 32 be separated.

Variations and modifications in the details of structure and arrangement of the parts may be resorted to within the spirit and coverage of the appended claims.

I claim:

1. A fabric-faced garment buckle comprising a pair of centrally-open base parts, one of which parts is substantially C-shaped in cross-section and has a flat medial portion with upstanding perimetrical flanges, the inner of which flanges is of less height than the outer flange and both of which flanges are tapered slightly inwardly toward each other, the other of which parts in cross-section is flat from its inner perimeter outwardly toward an upwardly-arched outer portion and with the transverse distance between the perimeters of the other base part being substantially the same as the transverse distance between the ends of the opposed perimetrical flanges on the one base part, the base parts being locked, the other within the one, in undeformed permanently-nested relationship solely by the interposed perimetrical portion of a piece of fabric tautened over the outer face of the one base part.

2. A fabric-faced garment buckle as defined in claim 1, wherein the axial depth of the other base part is materially less than the axial depth of the C-shaped base part.

3. An article of manufacture, for use in forming a fabric-faced belt-buckle, comprising a pair of centrally-open base parts formed of resilient material, one of the parts being substantially C-shaped in cross-section and having in cross-section a flat medial portion with upstanding perimetrical flanges, the inner of which flanges is of less height than the outer flange and both of which flanges are tapered slightly inwardly toward each other, the other part being substantially flat from its inner perimeter outwardly toward an upwardly-arched outer portion and with the transverse distance between the outer and inner perimeters of the other part in its preassembled form being substantially the same as the transverse distance between the ends of the opposed perimetrical flanges of the C-shaped cross-section of the one part in its preassembled form, whereby the parts are adapted to be locked, the other within the one, in undeformed permanently-nested relationship solely by a piece of fabric tautened over the one base part with its peripheral edge portion interposed between the opposite peripheries of the other base part and the opposed faces of the one part.

References Cited by the Examiner

UNITED STATES PATENTS

| 2,108,255 | 2/1938 | Devendor et al. | |
| 2,993,392 | 7/1961 | Decker et al. | 79—5 |
| 2,996,777 | 8/1961 | Mishkin | 24—113 X |

FOREIGN PATENTS

| 121,153 | 3/1946 | Australia. |
| 1,051,473 | 9/1953 | France. |
| 177,925 | 4/1922 | Great Britain. |

WILLIAM FELDMAN, *Primary Examiner.*

DONLEY J. STOCKING, *Examiner.*